(12) United States Patent
Gruber et al.

(10) Patent No.: US 8,348,297 B2
(45) Date of Patent: Jan. 8, 2013

(54) SLIDABLY ADJUSTABLE FIFTH WHEEL HITCH ASSEMBLY FOR A VEHICLE AND CONTROL SYSTEM FOR THE SAME

(75) Inventors: Rudolf Gruber, Uxbridge (CA); Mike Lehti, Ashburn (CA)

(73) Assignee: International Truck Intellectual Property Company, LLC, Lisle, IL (US)

( * ) Notice: Subject to any disclaimer, the term of this patent is extended or adjusted under 35 U.S.C. 154(b) by 330 days.

(21) Appl. No.: 12/883,663

(22) Filed: Sep. 16, 2010

(65) Prior Publication Data

US 2011/0068557 A1 Mar. 24, 2011

Related U.S. Application Data

(60) Provisional application No. 61/244,472, filed on Sep. 22, 2009.

(51) Int. Cl.
*B62D 53/08* (2006.01)
(52) U.S. Cl. ................. 280/438.1; 280/441
(58) Field of Classification Search ............ 280/438.1, 280/433, 441, 434, 407, 407.1, 405.1
See application file for complete search history.

(56) References Cited

U.S. PATENT DOCUMENTS

| | | | |
|---|---|---|---|
| 1,668,276 A * | 5/1928 | Jones | 280/428 |
| 1,862,115 A * | 6/1932 | Helms | 280/434 |
| 3,584,899 A | 6/1971 | Gottler et al. | |
| 4,391,455 A | 7/1983 | Fagerstedt | |
| 4,429,892 A | 2/1984 | Frampton | |
| 4,455,036 A * | 6/1984 | Barr | 280/432 |
| 4,549,745 A * | 10/1985 | Barr | 280/434 |
| 4,649,369 A | 3/1987 | Walker | |
| 4,677,429 A | 6/1987 | Glotzbach | |
| 4,926,331 A | 5/1990 | Windle | |
| 5,044,651 A | 9/1991 | Weikel | |
| 5,161,935 A | 11/1992 | Pelz et al. | |
| 5,203,850 A | 4/1993 | Harrold | |
| 5,344,173 A | 9/1994 | Beeler | |
| 5,365,436 A | 11/1994 | Schaller et al. | |
| 5,449,191 A | 9/1995 | Cattau | |
| 5,639,106 A * | 6/1997 | Vitale et al. | 280/407 |
| 5,772,229 A | 6/1998 | Cattau | |
| 5,863,057 A | 1/1999 | Wessels | |
| 5,876,055 A * | 3/1999 | Fontaine | 280/437 |
| 6,179,319 B1 | 1/2001 | Malisch | |
| 6,203,045 B1 | 3/2001 | Kyrtos | |
| 6,231,064 B1 | 5/2001 | Curry | |
| 6,308,977 B1 | 10/2001 | Pulliam | |
| 6,488,305 B2 | 12/2002 | Laarman | |
| 6,592,140 B1 | 7/2003 | Alguera Gallego | |
| 6,685,210 B2 * | 2/2004 | Lindenman et al. | 280/441 |
| 6,921,100 B2 | 7/2005 | Mantini | |
| 7,044,504 B2 | 5/2006 | Studebaker et al. | |
| 7,108,274 B2 | 9/2006 | Laarman | |
| 7,165,639 B2 | 1/2007 | Delaney et al. | |

(Continued)

FOREIGN PATENT DOCUMENTS

AT 0435802 E 7/2009
(Continued)

*Primary Examiner* — Tashiana Adams
(74) *Attorney, Agent, or Firm* — Jeffrey P. Calfa; Mark C. Bach

(57) ABSTRACT

An automatically adjustable fifth wheel assembly for a vehicle and trailer combination that adjusts the position of the trailer relative to the vehicle is disclosed.

20 Claims, 14 Drawing Sheets

U.S. PATENT DOCUMENTS

| | | |
|---|---|---|
| 7,455,138 B2 | 11/2008 | Delaney et al. |
| 7,490,846 B2 | 2/2009 | Kaun |
| 7,789,189 B2 | 9/2010 | Bigg et al. |
| 7,874,569 B2 * | 1/2011 | Schmidt et al. ............ 280/438.1 |
| 2002/0121762 A1 | 9/2002 | Laarman |
| 2002/0175493 A1 | 11/2002 | Laarman |
| 2002/0175494 A1 | 11/2002 | Laarman |
| 2002/0175495 A1 | 11/2002 | Laarman |
| 2003/0080539 A1 | 5/2003 | Thompson et al. |
| 2006/0125228 A1 | 6/2006 | Studebaker |
| 2007/0007747 A1 | 1/2007 | Laarman |
| 2008/0036173 A1 | 2/2008 | Alguera |
| 2009/0072515 A1 | 3/2009 | Alguera |
| 2009/0160159 A1 | 6/2009 | Alguera |
| 2009/0160214 A1 | 6/2009 | Alguera |

FOREIGN PATENT DOCUMENTS

| | | |
|---|---|---|
| DE | 1780488 A1 | 1/1972 |
| DE | 4324289 A1 | 1/1995 |
| DE | 19944684 | 11/2000 |
| DE | 102004045662 B4 | 3/2006 |
| DE | 102005060124 A1 | 6/2007 |
| EP | 0503954 A1 | 9/1992 |
| EP | 1717134 A3 | 7/2007 |
| EP | 1995158 A3 | 11/2008 |
| EP | 1409329 B1 | 7/2009 |
| FR | 2625472 A1 | 7/1989 |
| WO | 02070328 A1 | 9/2002 |
| WO | 2007068762 A1 | 6/2007 |

* cited by examiner

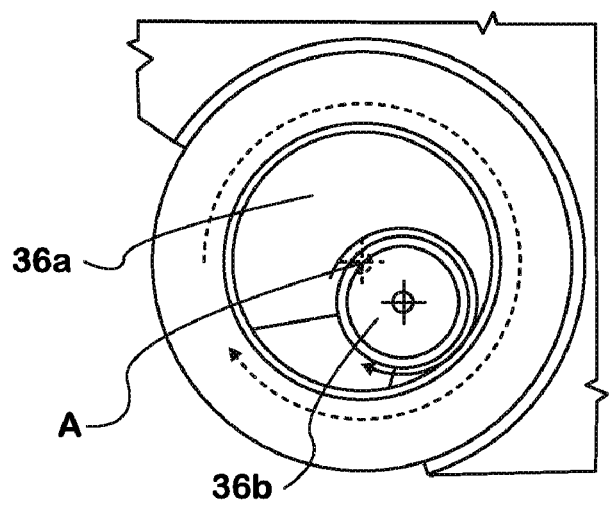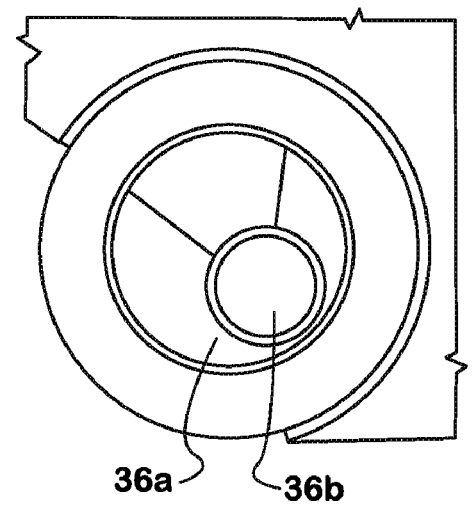
FIG. 5a  FIG. 5b

SLIDABLY ADJUSTABLE FIFTH WHEEL HITCH ASSEMBLY FOR A VEHICLE AND CONTROL SYSTEM FOR THE SAME

RELATED APPLICATIONS

The present application claims priority to U.S. Provisional Patent Application No. 61/244,472 filed on Sep. 22, 2009, which is herein incorporated by reference in its entirety.

TECHNICAL FIELD

The present disclosure relates to a moveable fifth wheel assembly for a vehicle and a control system for the same. More particularly, the disclosure relates to a fifth wheel assembly for a vehicle that automatically adjusts the distance between a trailer and the vehicle under certain appropriate operating conditions.

BACKGROUND

Over the last several years vehicle manufacturers and vehicle operators have worked to improve fuel efficiency of vehicles, so that vehicles may be less expensive to operate and meet more stringent fuel economy regulations. In some heavy-duty vehicles, such as semi trucks, or tractor-trailers, a vehicle is used to pull a trailer that contains cargo, and the location where the trailer connects to the vehicle is often referred to as a fifth wheel. One approach to improving fuel economy involves decreasing the distance between the vehicle and the trailer during certain operating conditions by moving the fifth wheel. Positioning the trailer in closer proximity to the vehicle improves aerodynamics of the vehicle and trailer combination, thus increasing fuel economy of the vehicle. However, in other operating conditions, it may be a disadvantage to position the trailer close to the vehicle, such as during a turn, during rapid deceleration, during low speed operations, or if the trailer is loaded in a manner that positioning the trailer closer to the vehicle would violate axle weight restrictions set by government regulations.

Therefore, a need exists for a system and method that is capable of automatically positioning a trailer relative to a vehicle by moving a fifth wheel assembly based upon operating conditions of the vehicle and trailer.

SUMMARY

According to one embodiment, a latch mechanism assembly for a slidably adjustable system comprises a latch body, a roller actuator assembly, an over-center pivot, and a rack. The latch body has a latching tooth portion is disposed at a first end of the latch body and a crank opening formed in a second end of the latch body. The roller actuator assembly is disposed at the first end of the latch body. The roller actuator assembly has an extended position and a retracted position. The over-center pivot is disposed within the crank opening. The over-center pivot has a crank portion and ground portion. The latch body pivots about the crank portion between a first latch position and second latch position. The crank portion rotates about the ground portion between a first crank position and a second crank position. The rotation of the crank portion about the ground portion to the second crank portion position allows the latch body to pivot about the crank portion to the second latch position. The rack has a plurality of rack teeth spaced a distance apart. The distance between each of the plurality of rack teeth is sized to receive the latching tooth. Positioning the roller actuator to the extended position rotates the crank portion from the first crank position to the second crank position.

According to another embodiment, a latch pair assembly for a slidably adjustable system comprises a first latch mechanism, a second latch mechanism, and a rack. The first latch mechanism comprises a first latch body, a first roller actuator, and a first over-center pivot. The first latch body has a first latching tooth portion disposed at a first end of the first latch body and a first crank opening formed in a second end of the first latch body. The first roller actuator assembly is disposed at the first end of the first latch body. The first roller actuator assembly has an extended position and a retracted position. The first over-center pivot is disposed within the first crank opening. The first over-center pivot has a first crank portion and a first ground portion. The first latch body pivots about the first crank portion between a first latch position and second latch position. The first crank portion rotates about the first ground portion between a first crank position and a second crank position. The rotation of the first crank portion about the first ground portion to the second crank position allows the first latch body to pivot about the first crank portion to the second latch position. The second latch mechanism comprises a second latch body, a second roller actuator, and a second over-center pivot. The second latch body has a second latching tooth portion disposed at a first end of the second latch body and a second crank opening formed in a second end of the second latch body. The second roller actuator assembly is disposed at the first end of the second latch body. The second roller actuator assembly has an extended position and a retracted position. The second over-center pivot is disposed within the first crank opening. The second over-center pivot has a second crank portion and a second ground portion. The second latch body pivots about the second crank portion between a first latch position and a second latch position. The second crank portion rotates about the second ground portion between a first crank position and a second crank position. The rotation of the second crank portion about the second ground portion to the second crank position allows the second latch body to pivot about the second crank portion to the second latch position. The rack has a plurality of rack teeth spaced a distance apart. The distance between each of the plurality of rack teeth is sized to receive the first latching tooth portion of the first latch mechanism and the second latching tooth portion of the second latch mechanism. Positioning the first roller actuator assembly in the extended position allows slidable movement in a first longitudinal direction. Positioning the second roller actuator assembly in the extended position allows slidable movement in a second longitudinal direction.

According to a further embodiment, a slidably adjustable fifth wheel hitch assembly comprises a fifth wheel hitch, a first rack, a second rack, a first latch mechanism, a second latch mechanism, a third latch mechanism, and a fourth latch mechanism. The fifth wheel hitch has a first position and a second position along a longitudinal axis. The first rack has a first plurality of rack teeth. The first rack is disposed on a first lateral side of the fifth wheel hitch. The second rack has a second plurality of rack teeth. The second rack is disposed on a second lateral side of the fifth wheel hitch. The first latch mechanism is disposed on the first lateral side of the fifth wheel hitch. The first latch mechanism has a latched position and an unlatched position. The second latch mechanism is disposed on the first lateral side of the fifth wheel hitch. The second latch mechanism being disposed rearward of the first latch mechanism. The second latch mechanism has a latched position and an unlatched position. The third latch mechanism is disposed on the second lateral side of the fifth wheel hitch. The third latch mechanism has a latched position and an unlatched position. The fourth latch mechanism is disposed on the second lateral side of the fifth wheel hitch. The fourth latch mechanism is disposed rearward of the third latch mechanism. The fourth latch mechanism has a latched position and an unlatched position. The first latch mechanism and the third latch mechanism are positioned in the unlatched position as the fifth wheel hitch moves from the first position to the second position.

BRIEF DESCRIPTION OF THE DRAWINGS

FIGS. 5a and 5b are detailed views of an over-center pivot for a latch mechanism;

DETAILED DESCRIPTION

Figure 1:
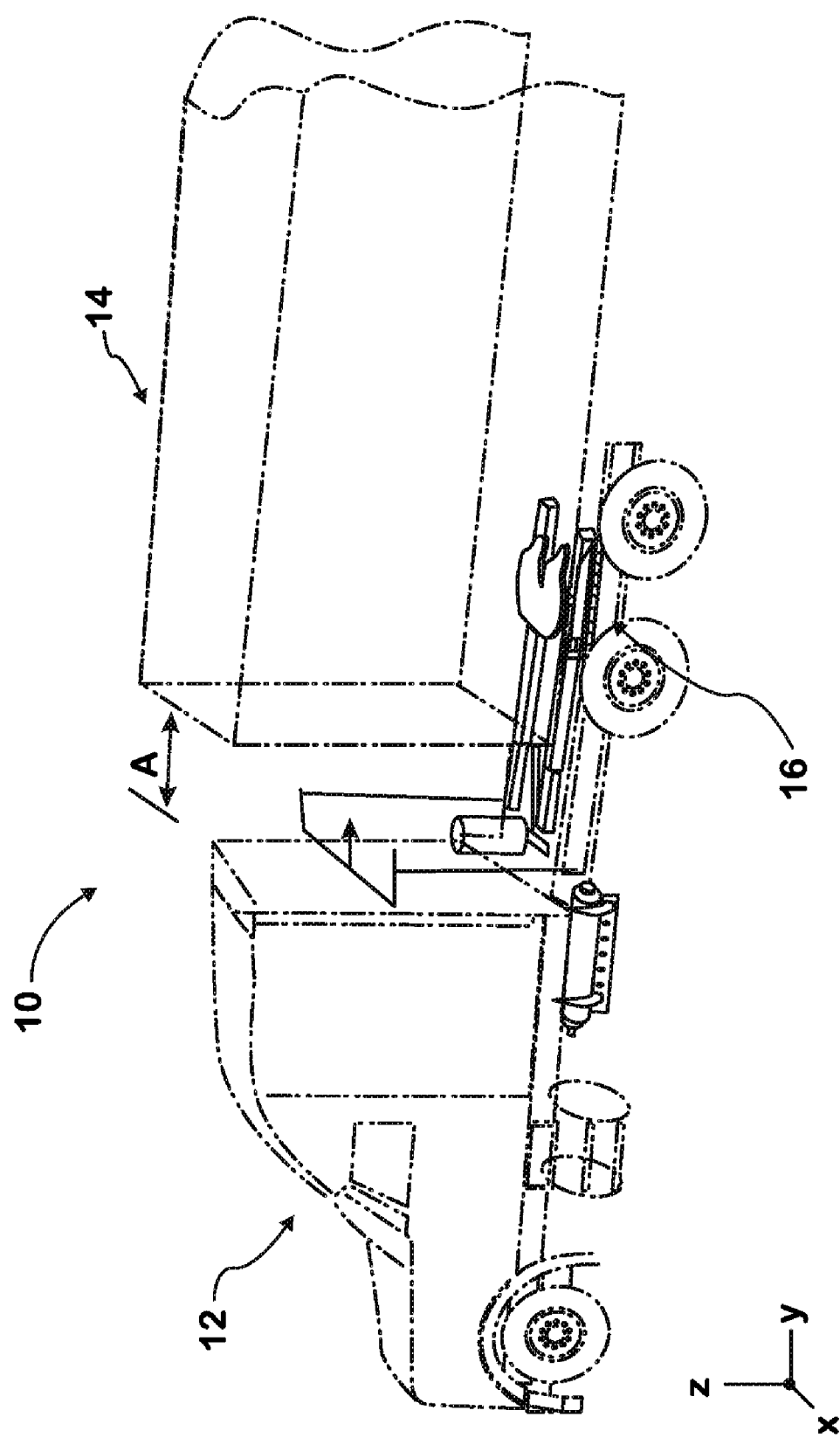
FIG. 1 is a perspective view of a vehicle having a slidably adjustable fifth wheel hitch assembly in a first position with an attached trailer.

FIG. 1 shows a vehicle and trailer combination 10 having a vehicle 12 and a trailer 14. The vehicle has a slidably adjustable fifth wheel hitch assembly 16. As shown in FIG. 1, the slidably adjustable fifth wheel hitch assembly 16 is disposed in a first position. In the first position, the trailer 14 is separated from the vehicle 12 a distance A. The distance A is sufficient to allow the vehicle 12 to turn without contacting the trailer 14.

Figure 2:
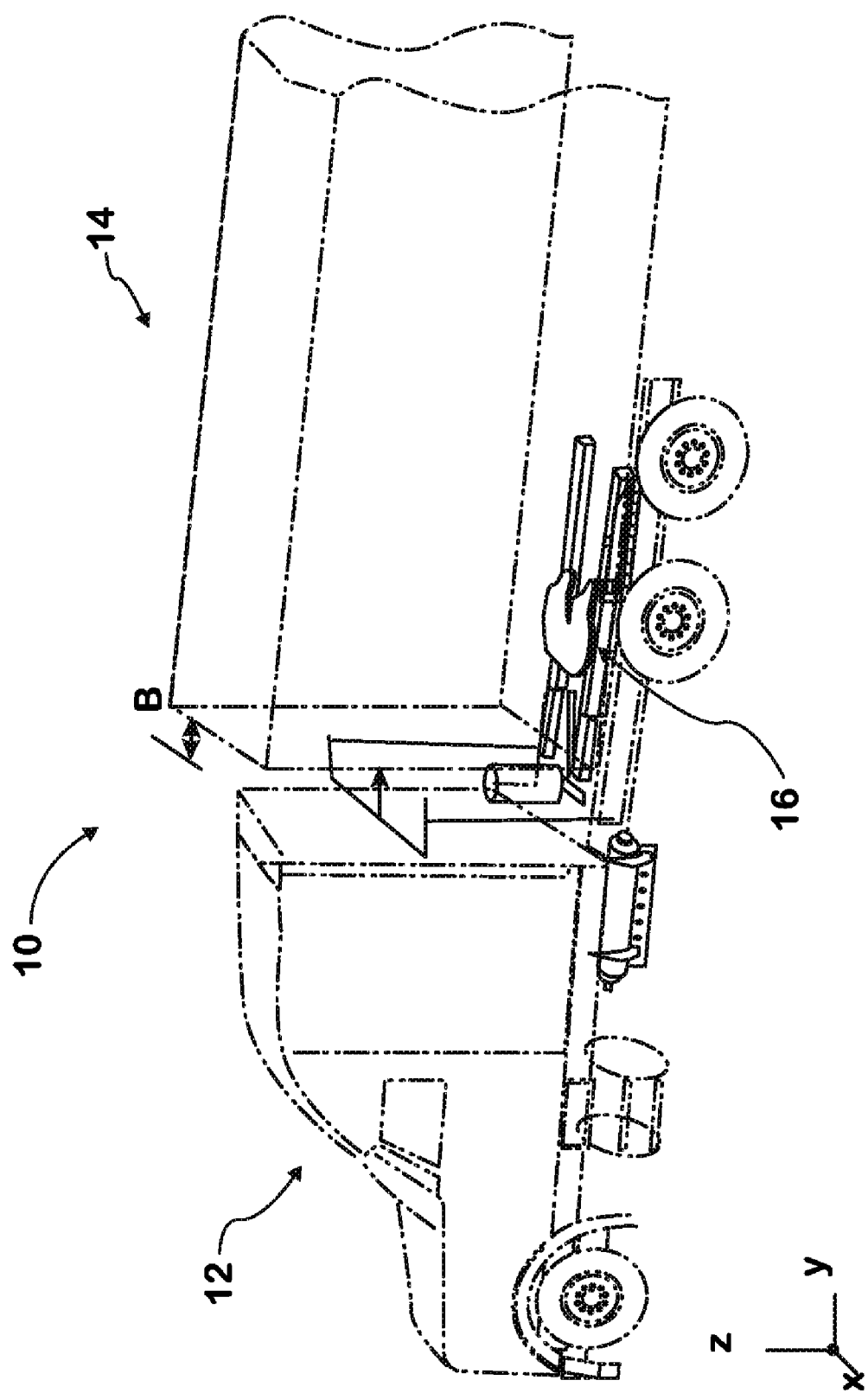
FIG. 2 is a perspective view of a vehicle having a movable fifth wheel assembly of FIG. 1 in a second position with an attached trailer.

FIG. 2 shows the vehicle and trailer combination 10 of FIG. 1, with the slidably adjustable fifth wheel hitch assembly 16 disposed in a second position. In the second position, the trailer 14 is separated from the vehicle 12 by a distance B. The distance B is less than the distance A of FIG. 1. In the second position with the trailer 14 closer to the vehicle 12, the aerodynamics of the vehicle and trailer combination 10 is improved. The improved aerodynamics of the vehicle and trailer combination 10 reduce the fuel consumption of the vehicle and trailer combination 10. The distance B between the vehicle 12 and the trailer 14 limit the allowable movement between the vehicle 12 and the trailer 14, such that some turns require that the trailer 14 be moved away from the vehicle 12 to prevent contact between the vehicle 12 and the trailer 14.

Figure 3:
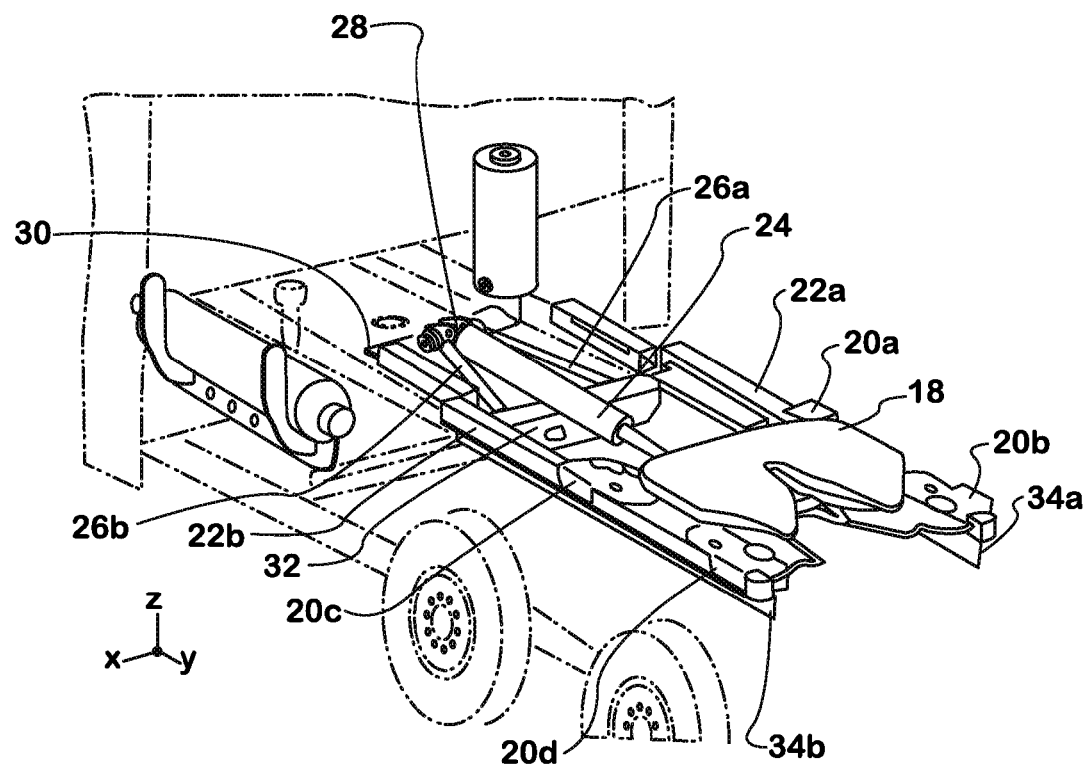
FIG. 3 is a detailed perspective view of the fifth wheel assembly of FIG. 1.

FIG. 3 depicts a detailed perspective view of the slidably adjustable fifth wheel hitch assembly 16. The slidably adjustable fifth wheel hitch assembly 16 has a fifth wheel hitch member 18 adapted to receive a pin from the trailer 14 in order to attach the trailer 14 to the vehicle 12. The fifth wheel hitch member 18 has a plurality of latch mechanism assemblies 20a-20d that releasably attach the fifth wheel hitch member 18 to a first rack 22a and a second rack 22b. As shown in FIG. 3, a first latch mechanism assembly 20a and a second latch mechanism assembly 20b releasably attach the fifth wheel hitch member 18 to the first rack 22a, while a third latch mechanism assembly 20c and fourth latch mechanism assembly 20d releasably attach the fifth wheel hitch member 18 to the second rack 22b.

A fifth wheel actuator, such as a hydraulic cylinder 24, is provided to adjust the slidably adjustable fifth wheel hitch assembly 16 in a direction generally parallel to a longitudinal axis of the vehicle 12. It is additionally contemplated that the fifth wheel actuator may be a pneumatic actuator, an electric motor, an electromagnetic device, a chain driven actuator, a pulley system, or other known actuator types, not just a hydraulic cylinder 24. The hydraulic cylinder 24 moves the slidably adjustable fifth wheel hitch assembly 16 when at least some of the plurality of latch mechanisms 20a-20d are released from the first and second racks 22a, 22b.

Figure 10:
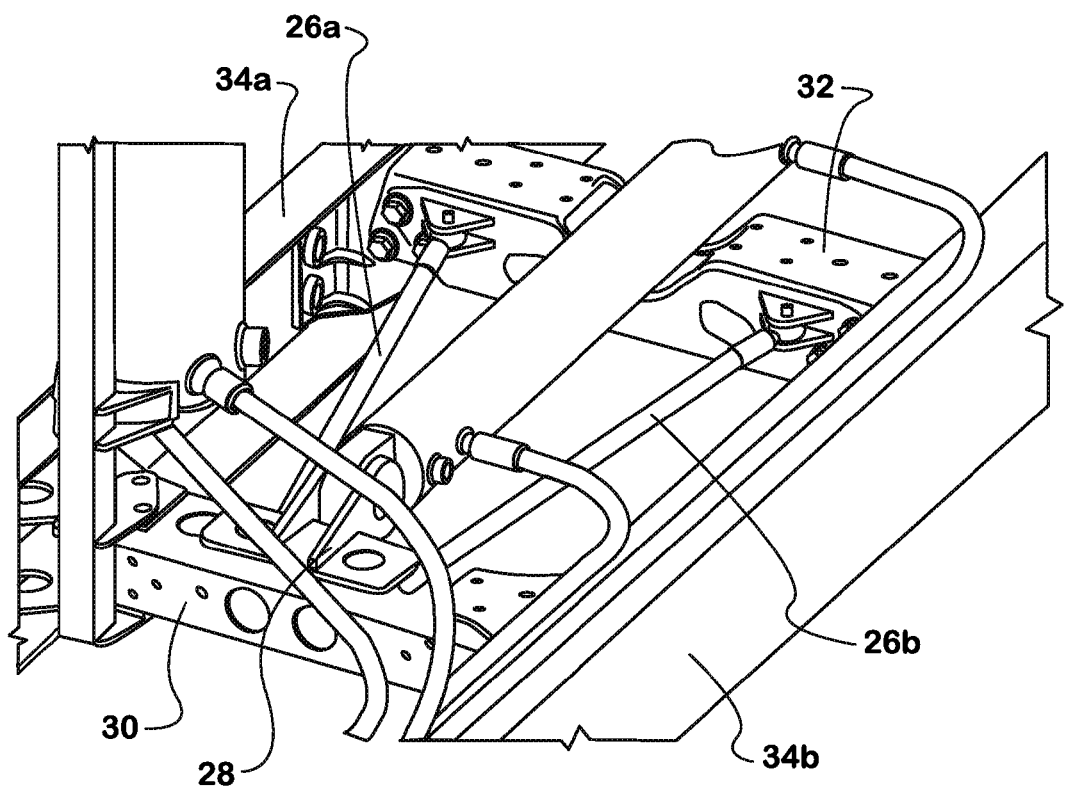
FIG. 10 is a perspective view of a cylinder mount assembly for a slidably adjustable fifth wheel hitch assembly according to one embodiment.

The hydraulic cylinder 24 attaches via a cylinder mount assembly 28 to a first frame cross member 30 that connects to a first frame rail 34a and a second frame rail 34b, as is additionally shown in FIG. 10. The cylinder mount assembly 28 is adapted to move laterally along the first frame cross member 30, such that additional torsional stress is not delivered to a first frame rail 34a and a second frame rail 34b of the vehicle 12 by the slidably adjustable fifth wheel hitch assembly 16.

The cylinder mount assembly 28 is constrained from movement in a longitudinal direction relative to the first frame cross member 30 by a first longitudinal support 26a and a second longitudinal support 26b. The first longitudinal support 26a and the second longitudinal support 26b connect the cylinder mount assembly 28 to a second frame cross member 32. The first frame cross member 30 connects to the first frame rail 34a and the second frame rail 34b. The second frame cross member 32 additionally connects to the first frame rail 34a and the second frame rail 34b. The first longitudinal support 26a and the second longitudinal support 26b distribute a longitudinal load placed on the cylinder mount assembly 28 to the second frame cross member 32. The first longitudinal support 26a connects to the second frame cross member 32 near the first frame rail 34a. The second longitudinal support 26b connects to the second frame cross member 32 near the second frame rail 34b. Therefore, the first and second longitudinal supports 26a, 26b distribute longitudinal loads from the hydraulic cylinder 24 to frame rails 34a, 34b of the vehicle 12, avoiding a concentration of stress along the first frame cross member 30.

Figure 4:
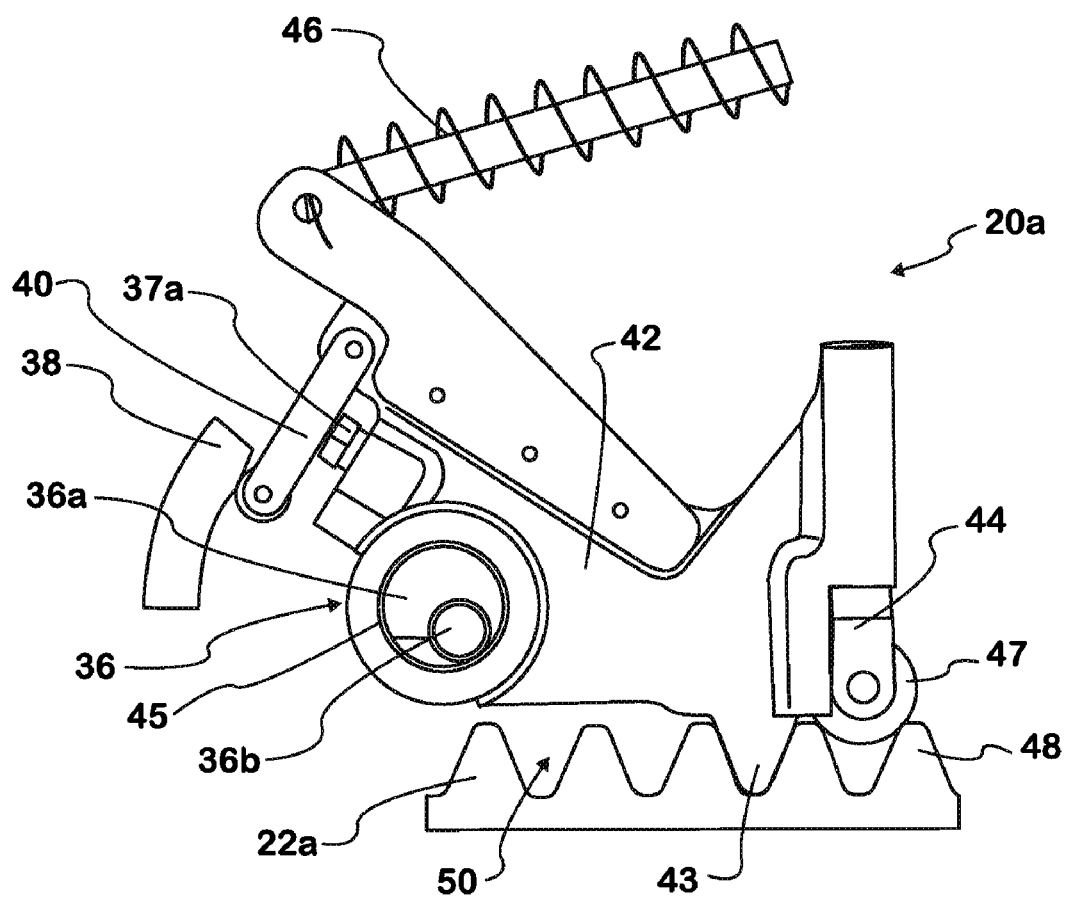
FIG. 4 is side view of a latch mechanism of an adjustable fifth wheel assembly according to one embodiment.

Turning now to FIG. 4, the first latch mechanism assembly 20a is shown in greater detail. The second, third and fourth latch mechanism assemblies 20b-20d function similarly to the first latch mechanism 20a. While the first latch mechanism assembly 20a is described in use with the slidably adjustable fifth wheel hitch assembly 16, it is additionally contemplated that the first latch mechanism assembly 20a may be utilized with other systems for moving equipment along an axis.

The first latch mechanism assembly 20a has a latch body 42 and is removably connected to the first rack 22a by a latching tooth portion 43 that interacts with a plurality of rack teeth 48. A locking space 50 is formed between each of the rack teeth 48, such that the latching tooth portion 43 is disposed within the locking space 50 when the latch mechanism 20a is engaged. The latching tooth portion 43 of the latch body 42 is disposed at a first end of the latch body 42.

The latch body 42 additionally has a crank opening 45 formed within the latch body 42. The crank opening 45 is disposed at a second end of the latch body 42. An over-center pivot 36 is disposed within the crank opening 45 of the of latch body 42. The latch body 42 is adapted to pivot about the over-center pivot 36. The over-center pivot 36 comprises a crank portion 36a and a ground portion 36b. The crank portion 36a pivots about the ground portion 36b to allow the latch body 42 to pivot about the over-center pivot 36.

As shown in FIG. 5a and FIG. 5b, the crank portion 36a rotates in the direction of arrow A about the ground portion 36b in order to lock the over-center pivot 36 and prevent the latch body 42 from pivoting about the over-center pivot 36. However, when the crank portion 36a has pivoted about the ground portion 36b as shown in FIG. 5b, the latch body 42 may rotate about the over-center pivot 36.

Figure 6:
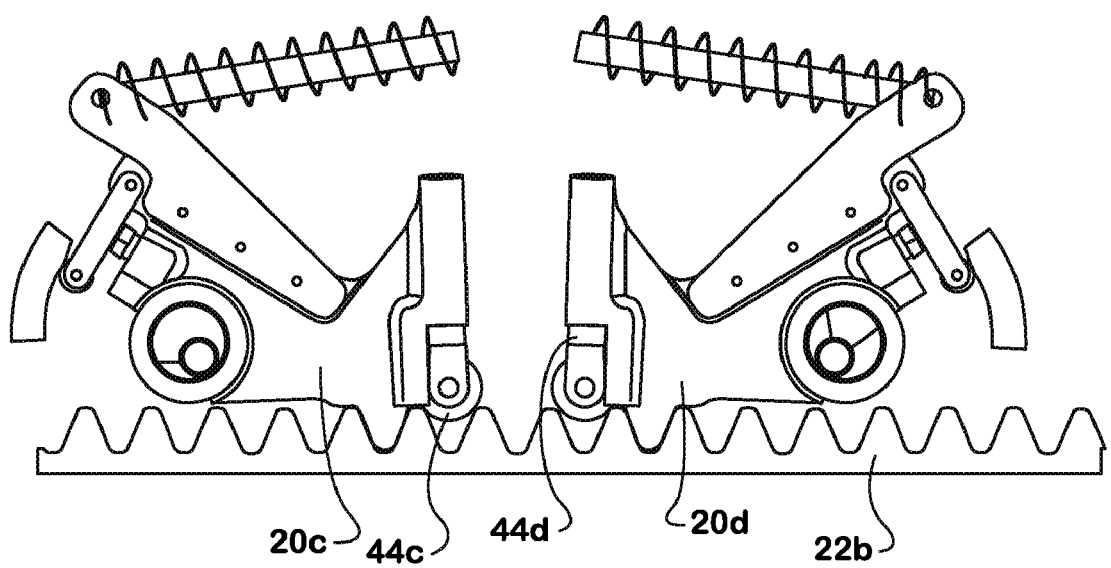
FIG. 6 is side view of a latch pair assembly in a latched position according to one embodiment.
Figure 7:
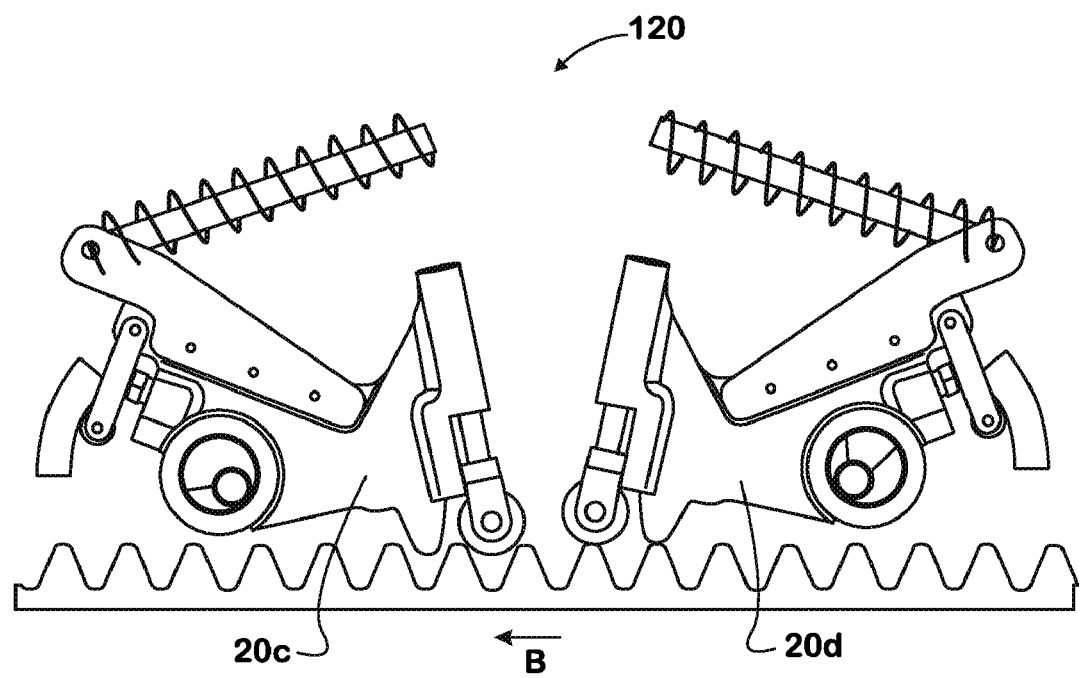
FIG. 7 is a side view of a latch pair assembly in an unlatched position according to one embodiment.

Turning to FIG. 4 and FIGS. 6-8, a roller actuator assembly 44 is disposed the first end of the latch body 42. The roller actuator assembly 44 has a wheel 47. The wheel 47 is sized to be partially disposed within the locking space 50. The roller actuator assembly 44 is hydraulically operated to position the roller actuator assembly 44 between an extended position, as shown in FIG. 7, and a retracted position, as shown in FIG. 6. The movement of the roller actuator assembly 44 to the extended position causes the crank portion 36a to rotate about the ground portion 36b of the over-center pivot 36 to allow the latch body 42 to rotate about the over-center pivot 36. Once the roller actuator assembly 44 is in the extended position, the latching tooth portion 43 of the latch mechanism 20a-20d is removed from the locking space 50, and the slidably adjustable fifth wheel hitch assembly 16 may be moved longitudinally.

As the roller actuator assembly 44 is extended, the latching tooth portion 43 moves up and out of the locking space 50 as the latch body 42 pivots about the over-center pivot 36. The roller actuator assembly 44 is disposed in the locking space 50 adjacent the locking space 50 containing latching tooth portion 43. The latching tooth portion 43 may contact one of the rack teeth 48 as the latching tooth portion 43 moves out of the locking space 50. The latching tooth portion 43 and the roller actuator assembly 44 are designed to prevent contact between a tip of the latching tooth portion 43 and tips of the rack teeth 48 to limit stress between the latching tooth portion 43 and the rack teeth 48. Once the roller actuator assembly 44 has moved to an adjacent locking space 50, the roller actuator assembly 44 may retract, and the latching tooth portion 43 reengages with an adjacent locking space 50.

Figure 8:
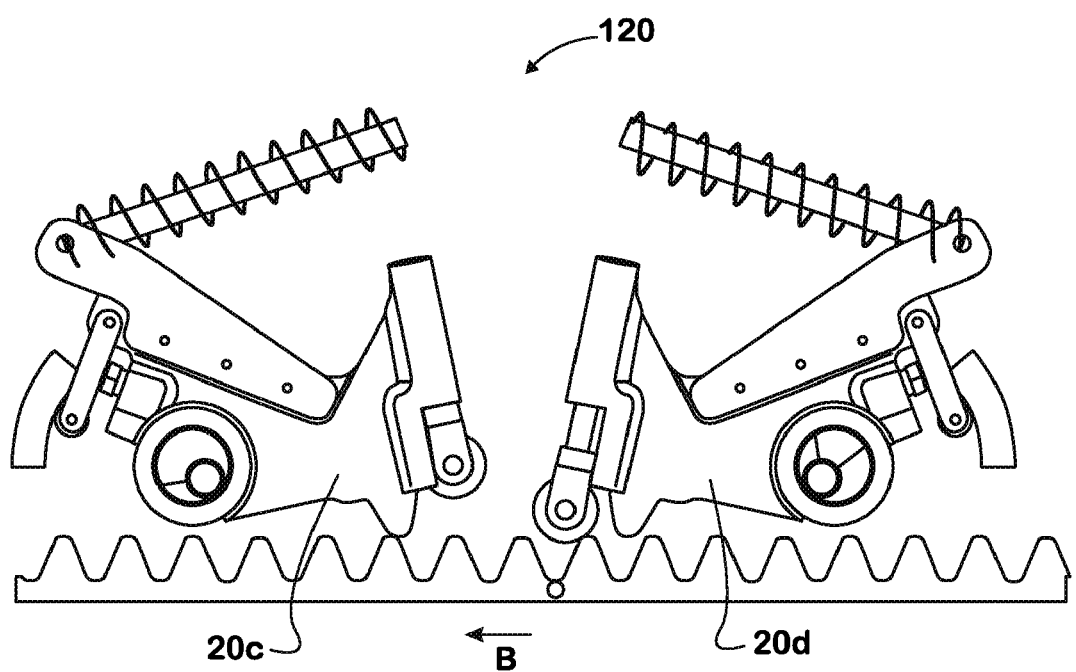
FIG. 8 is a side view of a latch pair assembly in an unlatched position according to another embodiment.

As shown in FIGS. 6-8, the third latch mechanism assembly 20c and the fourth latch mechanism assembly 20d are shown forming a latch pair assembly 120. As shown in FIG. 6, the roller actuator assembly 44d of the fourth latch mechanism assembly 20d and the roller actuator assembly 44c of the third latch mechanism assembly 20c are in the retracted position.

As shown in FIG. 7, the roller actuator assembly 44d of the fourth latch mechanism assembly 20d and the roller actuator assembly 44c of the third latch mechanism assembly 20c are in the extended position. Once the roller actuator 44d of the fourth latch mechanism assembly 20d is in the extended position, the latch pair assembly 120 may be moved in the direction of arrow B.

As shown in FIG. 8, the roller actuator assembly 44d of the fourth latch mechanism assembly 20d is in the extended position, while the roller actuator assembly 44c of the third latch mechanism assembly 20c is in the retracted position. Similarly, once the roller actuator 44d of the fourth latch mechanism assembly 20d is in the extended position, the latch pair assembly 120 may be moved in the direction of arrow B.

As shown in FIGS. 7 and 8, only the roller actuator assembly 44d of the fourth latch mechanism assembly 20d is required to be placed into the extended position to allow the latch pair assembly 120 to move in the direction of arrow B. Conversely, only the roller actuator assembly 44c of the third latch mechanism assembly 20c is required to be placed into the extended position to allow the latch pair assembly 120 to move in an opposite direction of arrow B. This is because the shape of the rack teeth 48 form a generally concave surface, such that latching tooth portion 43 of the latch mechanism assemblies 20a-20d may cam out of the locking space 50 in one longitudinal direction, but will remain within the locking space in the other longitudinal direction. Therefore, the use of a latch pair assembly 120 prevents movement of the slidably adjustable fifth wheel hitch assembly 16 in a longitudinal direction unless at least one of the roller actuator assemblies 44c, 44d is in the extended position.

Figure 9:
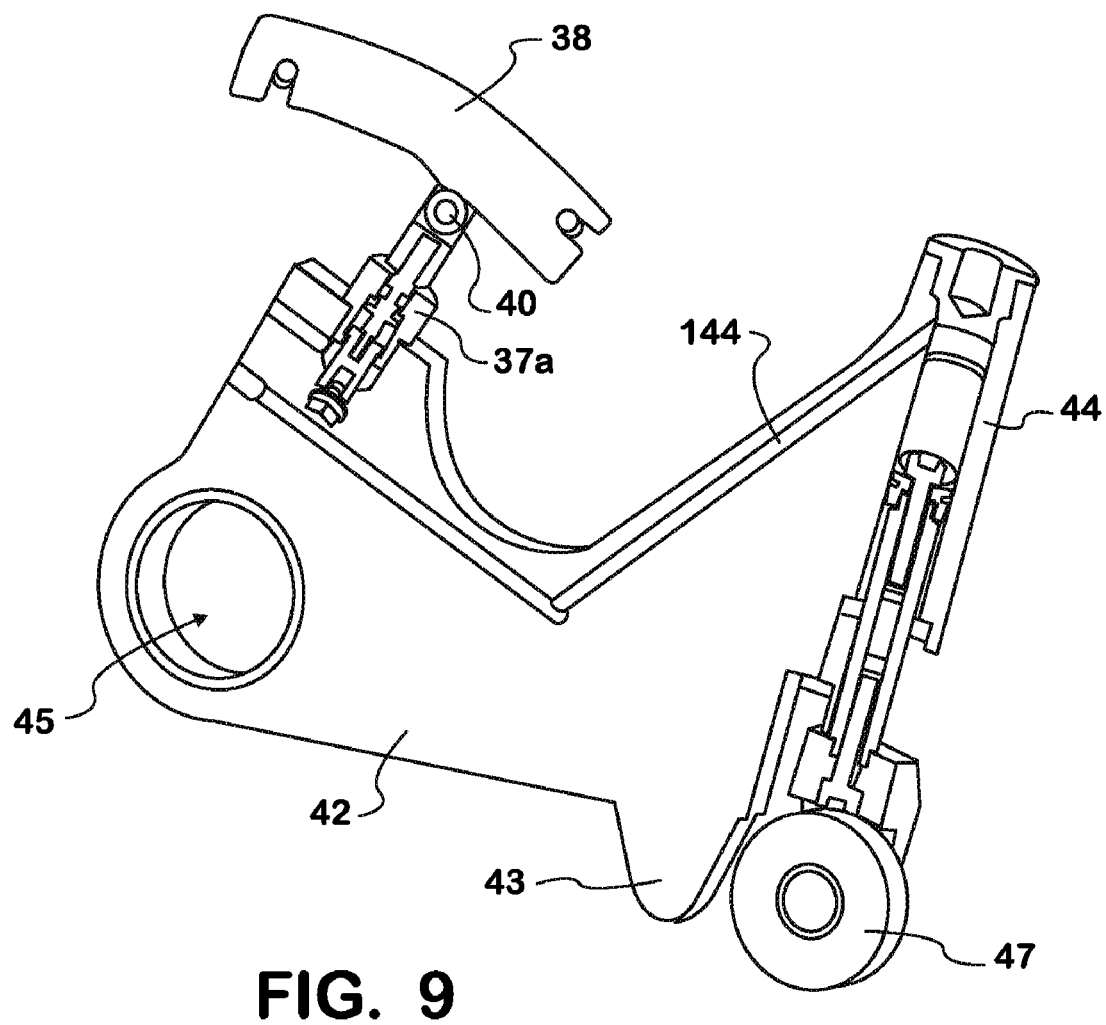
FIG. 9 is a sectional view of a latch mechanism according to one embodiment.

Turning back to FIG. 4, the first latch mechanism assembly 20a additionally comprises a latch valve assembly that comprises a hydraulic valve 37a disposed at the second end of the latch body 42 that is connected to a cam follower 40 that follows a cam surface 38. The hydraulic valve 37a has an open position and a closed position. The hydraulic valve 37a controls flow of hydraulic fluid to the roller actuator assembly 44. As the cam follower 40 moves along the cam surface 38, the hydraulic valve 37a closes, cutting off the flow of hydraulic fluid to the roller actuator assembly 44. As the roller actuator assembly 44a reaches the next locking space 50, the latching tooth portion 43 of the latch body 42 is returned to an adjacent locking space 50 to prevent additional movement of the slidably adjustable fifth wheel hitch assembly 16, unless the roller actuator assembly 44 is reactivated. In this way, the hydraulic valve 37a acts as a safety mechanism to secure the latching tooth portion 43 into a locking space 50 should a hydraulic failure occur, as a biasing member 46 is adapted to rotate the latch body 42 about the over-center pivot 36 so that the latching tooth portion 43 enters the locking space 50. As shown in FIG. 9, a hydraulic passageway 144 connects the hydraulic valve 37a with the roller actuator assembly 44, such that the closing of the hydraulic valve 37a deactivates the roller actuator assembly 44.

A biasing member 46 is provided to bias the latch mechanism assembly 20a towards a latched position. As shown, the biasing member 46 is a spring, however, it is contemplated that an elastomeric biasing member may be utilized. Should a hydraulic failure occur with the roller 44 extended, the biasing member 46 will bias the latching tooth portion 43 of the latch mechanism assembly 20a towards an engaged position, such that the latching tooth portion 43 will reenter a locking space 50, securing the latch mechanism 20a.

Figure 14:
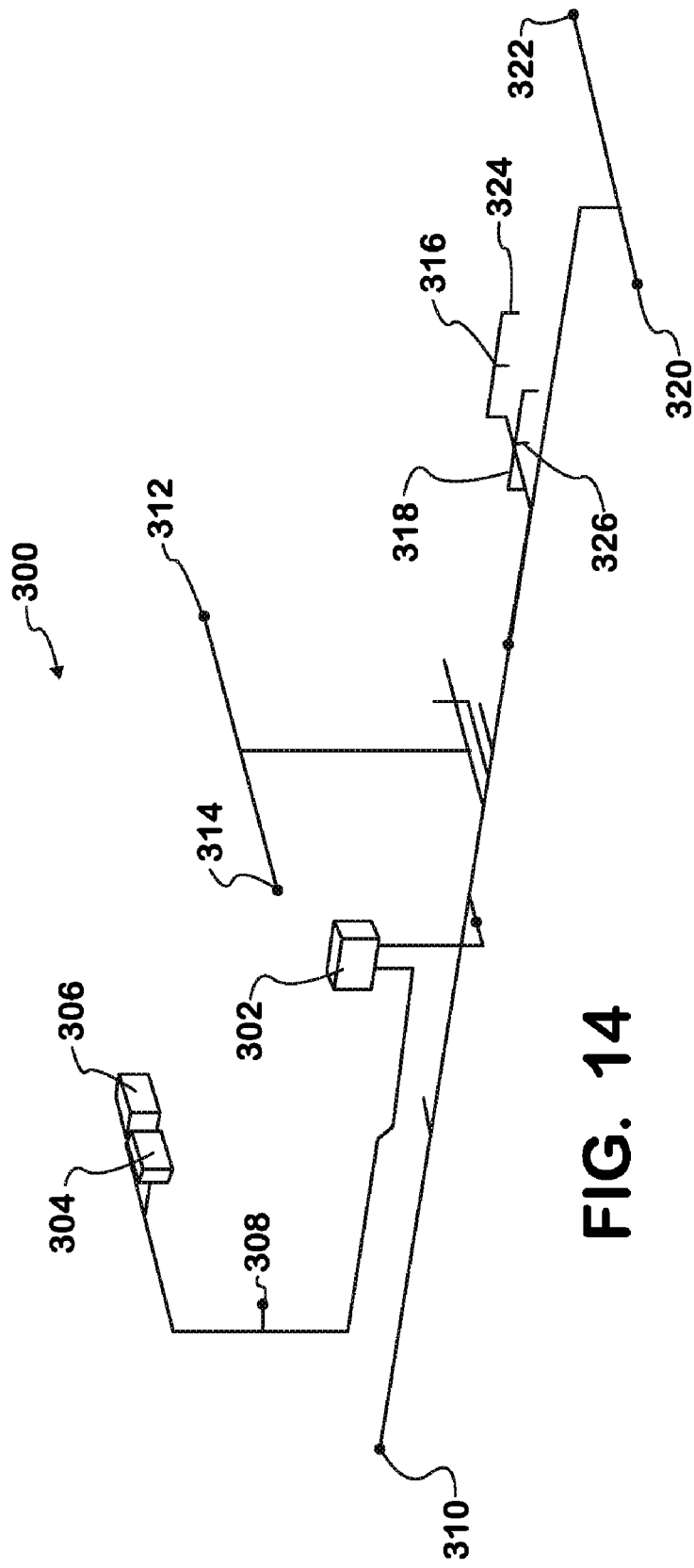
FIG. 14 is a perspective view of an electrical and control system of a vehicle having a slidably adjustable fifth wheel hitch assembly according to one embodiment.

FIG. 14 shows an electrical and control system 300 for a vehicle having a slidably adjustable fifth wheel hitch assembly 16 according to one embodiment. The electrical and control system comprises a controller 302 that is in communication with a plurality of sensors to monitor and control operation of the slidably adjustable fifth wheel hitch assembly 16. The controller 302 is additionally in communication with a display 304 and a power control unit 306 that supplies and regulates power to the electrical and control system 300. A steering sensor 308 is provided to monitor a steering rate of the vehicle. A wheel angle sensor 310 is provided to monitor the steering angle of the vehicle.

A first rear cab sensor 312 and a second rear cab sensor 314 are additionally provided. The first rear cab sensor 312 and the second rear cab sensor 314 determine a distance between a vehicle and a trailer, such as the distance between the rear of a vehicle cab and a front surface of the trailer. The controller 302 may additionally utilize a difference in the distance between the vehicle and the trailer indicated by the first rear cab sensor 312 and the second rear cab sensor 314 to determine an articulation angle of the trailer relative to the truck as well as a yaw rate of the trailer.

A plurality of sensors are provided near the slidably adjustable fifth wheel hitch assembly 16 including a first slidably adjustable fifth wheel hitch assembly position and status sensor 316 and a second slidably adjustable fifth wheel hitch assembly position and status sensor 318. The first fifth wheel hitch assembly position and status sensor 316 monitors whether a first pair of latch mechanisms are in a latched or released state and monitors the longitudinal position of the fifth wheel hitch assembly 16. Similarly, the second fifth wheel hitch assembly position and status sensor 318 monitors whether a second pair of latch mechanisms are in a latched or released state and monitors the longitudinal position of the fifth wheel hitch assembly. The controller 302 thus may control an actuator, such as a hydraulic cylinder, to move the slidably adjustable fifth wheel hitch assembly 16.

A first axle load sensor 324 and a second axle load sensor 326 are additionally provided. The first axle load sensor 324 monitors a load on a first rear axle of the vehicle, while the second axle load sensor 326 monitors a load on a second rear axle of the vehicle. The controller 302 monitors the load on the first rear axle and the second rear axle to ensure that the vehicle does not exceed an axle weight limit in place where the vehicle is operating.

A first rear vehicle sensor 320 and a second rear vehicle sensor 322 are additionally provided. The first rear vehicle sensor 320 and the second rear vehicle sensor 322 additionally determine a distance between the vehicle and the trailer, such as the distance between the rear of the vehicle and an undercarriage of the trailer. The controller 302 may additionally utilize a difference in the distance between the vehicle and the trailer indicated by the first rear vehicle sensor 320 and the second rear vehicle sensor 322 to determine an articulation angle of the trailer relative to the truck as well as a yaw rate of the trailer. The articulation angle and yaw rate based upon the rear vehicle sensors 320, 322 may be compared by the controller 302 to the articulation angle and the yaw rate based upon the rear cab sensors 312, 314 to serve as a additionally parameter the controller utilizes to control the actuator to move the slidably adjustable fifth wheel hitch assembly 16.

While sensors determining the distance between the vehicle and the trailer have been described as being disposed on the vehicle, it is additionally contemplated that sensors may be located on the trailer to determine the distance between the vehicle and the trailer and the articulation angle and yaw rates of the trailer. It is further contemplated that sensors may be found on both the vehicle and the trailer to determine the distance between the vehicle and the trailer and the articulation angle and yaw rates of the trailer.

Figure 11:
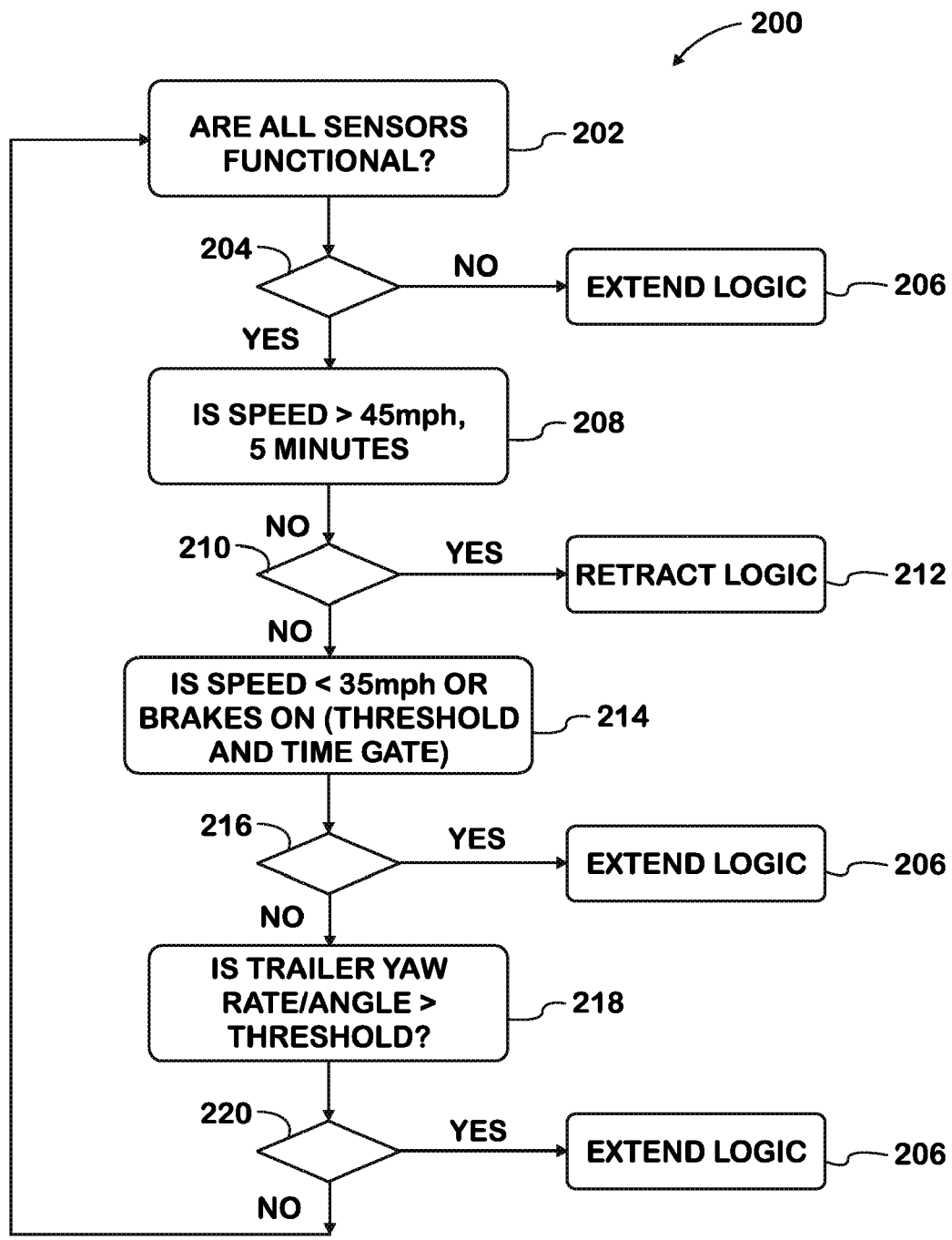
FIG. 11 is a block diagram showing a method moving a slidably adjustable fifth wheel hitch assembly.

Turning now to FIG. 11, a method 200 of controlling a slidably adjustable fifth wheel hitch assembly 16 is depicted. As shown at block 202, the method determines if all sensors are functioning. A decision block 204 directs the slidably adjustable fifth wheel hitch assembly 16 to a push back position block 206, i.e., away from a vehicle front, if not all of the sensors are functioning. However, if all sensors are functioning, the method progresses to block 208 to determine if the vehicle speed is more than a first predetermined speed and has been for a first preset time period, such as 45 miles per hour for a 5 minute time period. A decision block 210 directs the slidably adjustable fifth wheel hitch assembly to a pull forward position block 212, i.e., towards a vehicle front, if the vehicle is traveling at a speed above the first predetermined speed for the first preset time period. If the vehicle speed does not satisfy the first predetermined conditions, the decision block 210 moves the method to block 214, where it is determined if the vehicle speed is below a second predetermined speed for a second preset time period, or if the brakes are being applied. A decision block 216 determines if the conditions of the second predetermined speed and preset time period are met, or if the vehicle's brakes are being applied, the method again enters the push back position block 206. However, if the decision block 216 does not meet the conditions of block 214, the method determines if trailer movement exceeds preset ranges 218. At decision block 220, push back block 206 is selected if the trailer movement exceeds preset ranges, while the method returns to block 202 if the trailer movement does not exceed preset ranges.

Figure 12:
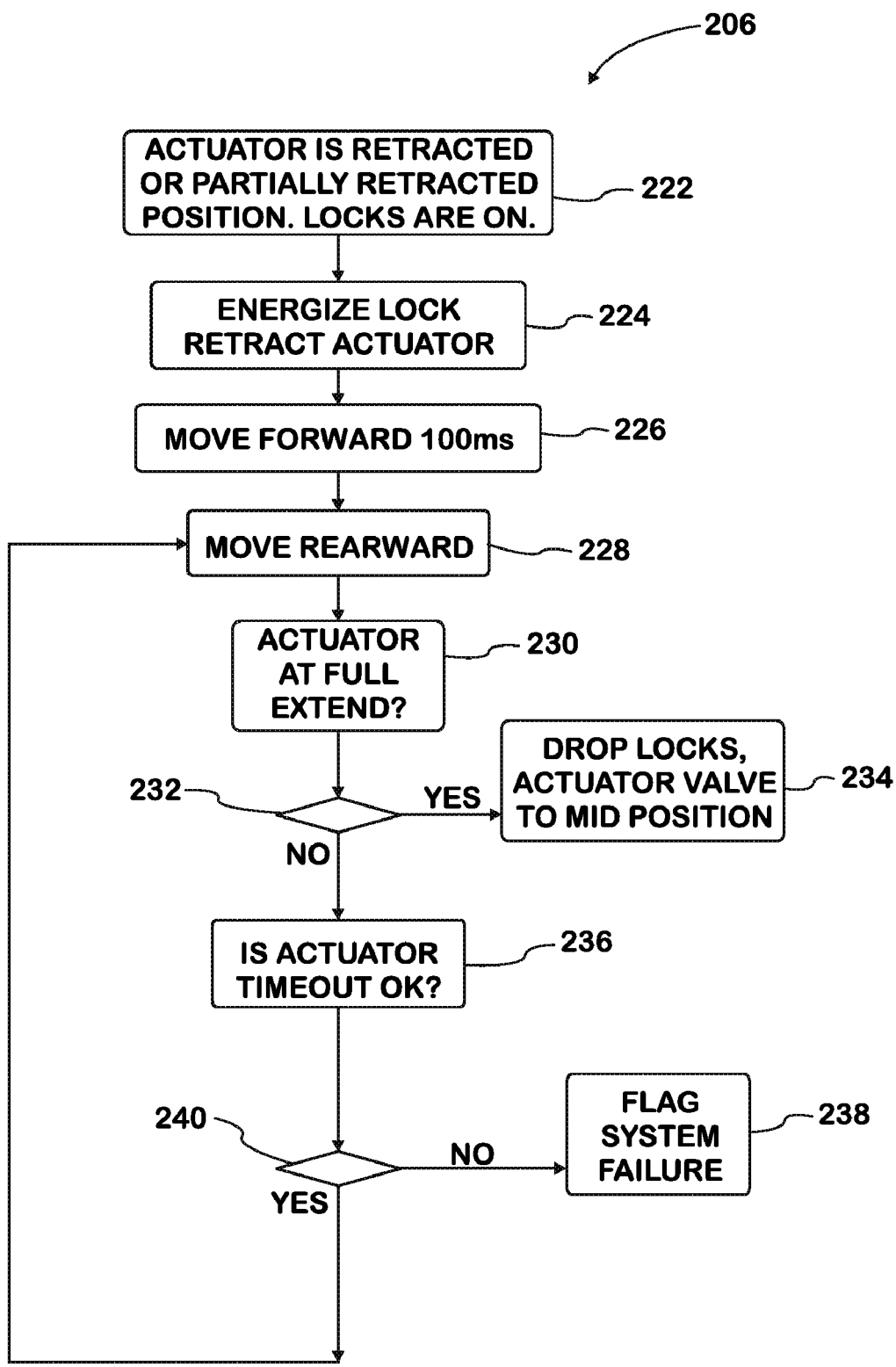
FIG. 12 is a block diagram showing a first sub-method of the method of FIG. 11.

Turning now to FIG. 12, push back position block 206 is shown. The method 206 confirms that the slidably adjustable fifth wheel hitch assembly 16 is in at least a partially retracted position at block 222. The method unlatches the latch mechanisms 20a-20d at block 224. The method moves the slidably adjustable fifth wheel hitch assembly forward for a short predetermined period of time at block 226. The method then moves the slidably adjustable fifth wheel hitch assembly 16 backward at block 228. At block 230, the method determines if the slidably adjustable fifth wheel hitch assembly 16 is at a fully extended position. A decision block 232 reengages the latch mechanisms 20a-20d if the slidably adjustable fifth wheel hitch assembly 16 is fully extended. If the slidably adjustable fifth wheel hitch assembly 16 is not fully extended, the method determines if a predetermined period of time has been exceeded during the movement of slidably adjustable fifth wheel hitch assembly 16. A decision block 240 generates an error condition at block 238 if the predetermined period of time has been exceeded, or returns to block 228 to continue to move the slidably adjustable fifth wheel hitch assembly backward.

Figure 13:
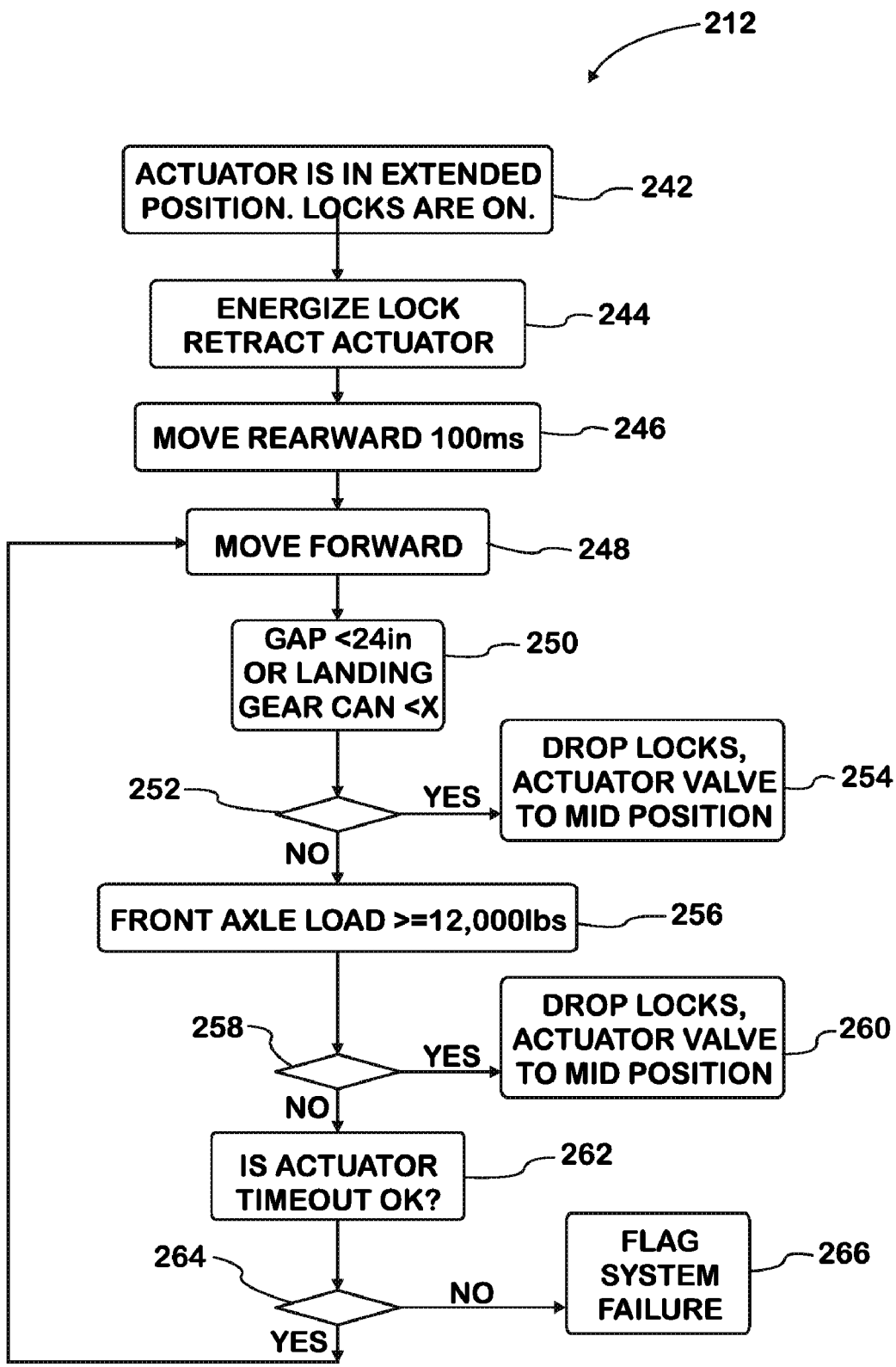
FIG. 13 is a block diagram showing a second sub-method of the method of FIG. 11.

Turning to FIG. 13, pull forward position block 212 is depicted. The method 212 confirms that the slidably adjustable fifth wheel hitch assembly 16 is in an extended position at block 242. The method unlatches the latch mechanisms 20a-20d at block 244. The method moves the slidably adjustable fifth wheel hitch assembly 16 backward for a short predetermined time at block 246. The method then moves the slidably adjustable fifth wheel hitch assembly 16 forward at block 248. The method determines if the trailer is within a predetermined distance of the cab at block 250. A decision block 252 reengages the latch mechanisms 20a-20d if the trailer is within the predetermined distance of the cab. If the trailer is not within the predetermined distance of the cab, the method determines if an axial load of the vehicle exceeds a predetermined threshold at block 256. A decision block 258 reengages the latch mechanisms 20a-20d if the axial load of the vehicle exceeds the predetermined threshold. If the axial load of the vehicle does not exceed the predetermined threshold, the method determines if a predetermined period of time has been exceeded at block 262. A decision block 264 generates an error condition at block 266 if the predetermined time has been exceeded, or returns to block 248.

It will be understood that a control system may be implemented in hardware to effectuate the method. The control system can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

When the control system is implemented in software, it should be noted that the control system can be stored on any computer readable medium for use by or in connection with any computer related system or method. In the context of this document, a "computer-readable medium" can be any medium that can store, communicate, propagate, or transport the program for use by or in connection with the instruction execution system, apparatus, or device. The computer readable medium can be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). The control system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

What is claimed is:

1. A latch mechanism assembly for a slidably adjustable system comprising:
    a latch body having a latching tooth portion disposed at a first end of the latch body and a crank opening formed in a second end of the latch body;
    an over-center pivot disposed in the crank opening, the over-center pivot having a crank portion and ground portion, wherein the latch body pivots about the crank portion between a first latch position and second latch position, and wherein the crank portion rotates about the ground portion between a first crank position and a second crank position, the rotation of the crank portion about the ground portion to the second crank portion position allows the latch body to pivot about the crank portion to the second latch position;
    a rack having a plurality of rack teeth spaced a distance apart, the distance between each of the plurality of rack teeth being sized to receive the latching tooth; and
    a roller actuator assembly disposed at the first end of the latch body; the roller actuator assembly having an extended position and a retracted position, wherein when the roller actuator is in the extended position the crank portion rotates from the first crank position to the second crank position.

2. The latch mechanism of claim 1, further comprising a wheel disposed at a distal end of the roller actuator assembly and in contact with the rack.

3. The latch mechanism of claim 1, wherein the wheel is sized to be at least partially disposed within the distance formed between the plurality of rack teeth.

4. The latch mechanism claim 1, wherein the latching tooth portion has a complimentary shape to an opening formed in between the plurality of rack teeth.

5. The latch mechanism of claim 1, wherein the roller actuator assembly is hydraulically operated.

6. The latch mechanism of claim 5, further comprising a latch valve assembly comprising:
    a hydraulic valve disposed on the second end of the latch body, the hydraulic valve having an open position and a closed position, the hydraulic valve being coupled to a cam follower, and the hydraulic valve being disposed in fluid communication with the roller actuator assembly, wherein the hydraulic valve controls a flow of hydraulic fluid to the roller actuator assembly to position the roller actuator assembly between the extended position and the retracted position; and
    a cam surface in contact with the cam follower of the hydraulic valve.

7. The latch mechanism of claim 1, further comprising a biasing member coupled to the latch body to rotate the latch body towards the first latch position.

8. The latch mechanism of claim 1, wherein the rack teeth form a generally concave surface.

9. A latch pair assembly for a slidably adjustable system comprising:
    a first latch mechanism comprising:
        a first latch body having a first latching tooth portion disposed at a first end of the first latch body and a first crank opening formed in a second end of the first latch body;
        a first roller actuator assembly disposed at the first end of the first latch body, the first roller actuator assembly having an extended position and a retracted position; and
        a first over-center pivot disposed in the first crank opening, the first over-center pivot having a first crank portion and a first ground portion, wherein the first latch body pivots about the first crank portion between a first latch position and second latch position, and wherein the first crank portion rotates about the first ground portion between a first crank position and a second crank position, the rotation of the first crank portion about the first ground portion to the second crank portion position allowing the first latch body to pivot about the first crank portion to the second latch position;
    a second latch mechanism comprising:
        a second latch body having a second latching tooth portion disposed at a first end of the second latch body and a second crank opening formed in a second end of the second latch body;
        a second roller actuator assembly disposed at the first end of the second latch body, the second roller actuator assembly having an extended position and a retracted position; and
        a second over-center pivot disposed in the second crank opening, the second over-center pivot having a second crank portion and a second ground portion, wherein the second latch body pivots about the second crank portion between a first latch position and a second latch position, and wherein the second crank portion rotates about the second ground portion between a first crank position and a second crank position, the rotation of the second crank portion about the second ground portion to the second crank portion position allowing the second latch body to pivot about the second crank portion to the second latch position; and a rack having a plurality of rack teeth spaced a distance apart, the distance between each of the plurality of rack teeth forming an opening sized to receive the first latching tooth portion of the first latch mechanism and the second latching tooth portion of the second latch mechanism;

wherein the first roller actuator assembly in the extended position allows slidable movement in a first longitudinal direction; and wherein the second roller actuator assembly in the extended position allows slidable movement in a second longitudinal direction.

10. The latch pair assembly of claim 9, further comprising a first wheel disposed at a distal end of the first roller actuator assembly and in contact with the rack.

11. The latch pair assembly for a slidably adjustable system of claim 10, further comprising a second wheel disposed at a distal end of the second roller actuator assembly and in contact with the rack.

12. The latch pair assembly of claim 9, further comprising a first latch valve assembly comprising:

a first hydraulic valve disposed on the second end of the first latch body, the first hydraulic valve having an open position and a closed position, the first hydraulic valve being coupled to a first cam follower, and the first hydraulic valve being disposed in fluid communication with the first roller actuator assembly, wherein the first hydraulic valve controls a flow of hydraulic fluid to the first roller actuator assembly to position the first roller actuator assembly between the extended position and the retracted position; and a first cam surface in contact with the first cam follower of the first hydraulic valve.

13. The latch pair assembly for a slidably adjustable system of claim 12, further comprising a second latch valve assembly comprising:

a second hydraulic valve disposed on the second end of the second latch body, the second hydraulic valve having an open position and a closed position, the second hydraulic valve being coupled to a second cam follower, and the second hydraulic valve being disposed in fluid communication with the second roller actuator assembly, wherein the second hydraulic valve controls a flow of hydraulic fluid to the second roller actuator assembly to position the second roller actuator assembly between the extended position and the retracted position; and a second cam surface in contact with the second cam follower of the second hydraulic valve.

14. The latch pair assembly for a slidably adjustable system of claim 9, wherein the first latching tooth portion has a complimentary shape to the opening formed between the plurality of rack teeth.

15. The latch pair assembly for a slidably adjustable system of claim 14, wherein the second latching tooth portion has a complimentary shape to the opening formed between the plurality of rack teeth.

16. The latch pair assembly for a slidably adjustable system of claim 9, wherein the rack teeth form a generally concave surface.

17. The latch pair assembly for a slidably adjustable system of claim 9, wherein positioning the second roller actuator assembly in the retracted position allows slidable movement in the first longitudinal direction.

18. The latch pair assembly for a slidably adjustable system of claim 9, wherein positioning the first roller actuator assembly in the retracted position allows slidable movement in the second longitudinal direction.

19. A slidably adjustable fifth wheel hitch assembly comprising:

a fifth wheel hitch having a first position and a second position along a longitudinal axis;

a first rack having a first plurality of rack teeth disposed on a first lateral side of the fifth wheel hitch;

a second rack having a second plurality of rack teeth disposed on a second lateral side of the fifth wheel hitch;

a first latch mechanism being disposed on the first lateral side of the fifth wheel hitch, the first latch mechanism having a latched position and an unlatched position;

a second latch mechanism being disposed on the first lateral side of the fifth wheel hitch, the second latch mechanism being disposed rearward of the first latch mechanism, the second latch mechanism having a latched position and an unlatched position;

a third latch mechanism being disposed on the second lateral side of the fifth wheel hitch, the third latch mechanism having a latched position and an unlatched position; and a fourth latch mechanism being disposed on the second lateral side of the fifth wheel hitch, the fourth latch mechanism being disposed rearward of the third latch mechanism, the fourth latch mechanism having a latched position and an unlatched position;

wherein the first latch mechanism and the third latch mechanism being positioned in the unlatched position as the fifth wheel hitch moves from the first position to the second position.

20. The slidably adjustable fifth wheel hitch assembly of claim 19, wherein the second latch mechanism and the fourth latch mechanism being positioned in the unlatched position as the fifth wheel hitch moves from the second position to the first position.

* * * * *